(12) United States Patent
Magnusson et al.

(10) Patent No.: US 10,902,483 B2
(45) Date of Patent: Jan. 26, 2021

(54) COMPUTER-IMPLEMENTED METHOD AND COMPUTER PROGRAM FOR DESIGNING AND COST-ESTIMATING IRRIGATION SYSTEMS

(71) Applicant: LINDSAY CORPORATION, Omaha, NE (US)

(72) Inventors: Brian James Magnusson, Omaha, NE (US); Kurtis Arlan Charling, Omaha, NE (US)

(73) Assignee: Lindsay Corporation, Omaha, NE (US)

( * ) Notice: Subject to any disclaimer, the term of this patent is extended or adjusted under 35 U.S.C. 154(b) by 380 days.

(21) Appl. No.: 15/954,740

(22) Filed: Apr. 17, 2018

(65) Prior Publication Data

US 2018/0315100 A1    Nov. 1, 2018

Related U.S. Application Data (60) Provisional application No. 62/491,017, filed on Apr. 27, 2017.

(51) Int. Cl.
  *G06Q 10/00* (2012.01)
  *G06Q 30/02* (2012.01)
  (Continued)

(52) U.S. Cl.
  CPC ......... *G06Q 30/0283* (2013.01); *A01G 25/00* (2013.01); *A01G 25/092* (2013.01);
  (Continued)

(58) Field of Classification Search
  None
  See application file for complete search history.

(56) References Cited

U.S. PATENT DOCUMENTS 3,703,990 A * 11/1972 Erickson .............. A01G 25/092
                                                        239/11
4,580,731 A *  4/1986 Kegel .................. A01G 25/092
                                                        239/731

(Continued)

OTHER PUBLICATIONS

A.K. Plappally, J.H. Lienhard V (Energy requirements for water production, treatment, end use, reclamation, and disposal, Renewable and Sustainable Energy Reviews 16 (2012) 4818-4848) (Year: 2012).*

(Continued)

*Primary Examiner* — Hafiz A Kassim
(74) *Attorney, Agent, or Firm* — Hovey Williams LLP (57) ABSTRACT

A computer-implemented method and computer program for designing and cost-estimating irrigation systems according to weather data, soil data, topography data, aerial imagery, and past yield data. Irrigation metrics such as evapotranspiration, irrigation system flow rate requirements, expected annual total water requirements, expected annual irrigation water requirements, supply point required pressure, end point required pressure, maximum irrigation acreage and crop yield and/or market value of lost yield under limited flow rate conditions, electric power generator size, pump size, pipeline supply system size, annual irrigation system usage, related equipment usage, operating costs, a sprinkler configuration, and other aspects of the irrigation systems may be optimized via an interactive user interface.

16 Claims, 3 Drawing Sheets

(51) Int. Cl.
   *A01G 25/00* (2006.01)
   *A01G 25/09* (2006.01)
   *G06F 30/17* (2020.01)
   *G06F 30/20* (2020.01)
   *G06F 111/06* (2020.01)
   *G06F 113/14* (2020.01)

(52) U.S. Cl.
   CPC .............. *G06F 30/17* (2020.01); *G06F 30/20* (2020.01); *G06F 2111/06* (2020.01); *G06F 2113/14* (2020.01); *Y04S 50/14* (2013.01)

(56) References Cited

U.S. PATENT DOCUMENTS

| | | | | | |
|---|---|---|---|---|---|
| 5,467,271 | A | * | 11/1995 | Abel | A01B 79/005 702/5 |
| 5,696,671 | A | * | 12/1997 | Oliver | A01G 25/16 700/284 |
| 5,740,038 | A | * | 4/1998 | Hergert | A01G 25/092 700/284 |
| 5,927,603 | A | * | 7/1999 | McNabb | A01G 25/092 239/63 |
| 6,236,907 | B1 | * | 5/2001 | Hauwiller | A01B 79/005 111/200 |
| 6,453,216 | B1 | * | 9/2002 | McCabe | A01G 25/16 700/284 |
| 6,823,239 | B2 | * | 11/2004 | Sieminski | A01G 25/167 239/69 |
| 7,146,254 | B1 | * | 12/2006 | Howard | A01G 25/167 700/284 |
| 7,412,303 | B1 | * | 8/2008 | Porter | A01G 25/167 239/69 |
| 9,202,252 | B1 | * | 12/2015 | Smith | G06F 30/20 |
| 9,569,803 | B1 | * | 2/2017 | France | G06Q 50/06 |
| 10,607,171 | B1 | * | 3/2020 | Dobbins | G06Q 10/06315 |
| 2004/0039489 | A1 | * | 2/2004 | Moore | A01G 25/16 700/284 |
| 2004/0078092 | A1 | * | 4/2004 | Addink | A01G 25/16 700/1 |
| 2004/0181315 | A1 | * | 9/2004 | Cardinal | A01G 25/167 700/284 |
| 2005/0038569 | A1 | * | 2/2005 | Howard | A01G 25/167 700/284 |
| 2005/0082382 | A1 | * | 4/2005 | Evelyn-Veere | A01G 25/167 239/63 |
| 2005/0187666 | A1 | * | 8/2005 | Marian | G05D 22/02 700/284 |
| 2005/0211791 | A1 | * | 9/2005 | Clark | A01G 25/167 239/67 |
| 2005/0234691 | A1 | * | 10/2005 | Singh | G06Q 10/04 703/11 |
| 2005/0246102 | A1 | * | 11/2005 | Patwardhan | A01G 25/16 702/2 |
| 2005/0273300 | A1 | * | 12/2005 | Patwardhan | G06F 30/20 703/9 |
| 2006/0122736 | A1 | * | 6/2006 | Alexanian | A01G 25/167 700/284 |
| 2006/0242154 | A1 | * | 10/2006 | Rawat | G06F 16/168 |
| 2007/0267524 | A1 | * | 11/2007 | Mack | A01G 25/092 239/729 |
| 2008/0091307 | A1 | * | 4/2008 | Dansereau | G01W 1/02 700/284 |
| 2009/0005990 | A1 | * | 1/2009 | Anderson | G06Q 10/00 702/2 |
| 2009/0150000 | A1 | * | 6/2009 | Stelford | A01G 25/092 700/284 |
| 2009/0150001 | A1 | * | 6/2009 | Fekete | G05B 15/02 700/284 |
| 2009/0277506 | A1 | * | 11/2009 | Bradbury | A01G 25/16 137/1 |
| 2010/0144534 | A1 | * | 6/2010 | Pullen | A01G 25/02 504/357 |
| 2010/0212409 | A1 | * | 8/2010 | Ranjan | G01N 5/02 73/73 |
| 2010/0306012 | A1 | * | 12/2010 | Zyskowski | G06Q 10/06 705/7.36 |
| 2013/0087631 | A1 | * | 4/2013 | Pfrenger | A01G 25/02 239/1 |
| 2013/0087640 | A1 | * | 4/2013 | Pfrenger | A01G 25/09 239/723 |
| 2013/0090772 | A1 | * | 4/2013 | Pfrenger | G05D 3/12 700/284 |
| 2013/0310992 | A1 | * | 11/2013 | Larsen | A01G 25/16 700/284 |
| 2014/0031996 | A1 | * | 1/2014 | Nickerson | G05B 15/02 700/284 |
| 2016/0232621 | A1 | * | 8/2016 | Ethington | G06Q 50/02 |
| 2016/0260021 | A1 | * | 9/2016 | Marek | G06Q 50/02 |
| 2017/0228743 | A1 | * | 8/2017 | Cousins | G06Q 30/0202 |

OTHER PUBLICATIONS

Inmaculada Pulido-Calvo* and Juan Carlos Gutiérrez-Estrada (Selection and Operation of Pumping Stations of Water Distribution Systems, Environmental Research Journal, vol. 5, Issue 3 pp. 1-20, 2011 Nova Science Publishers, Inc.)). (Year: 2011).*

* cited by examiner

COMPUTER-IMPLEMENTED METHOD AND COMPUTER PROGRAM FOR DESIGNING AND COST-ESTIMATING IRRIGATION SYSTEMS

RELATED APPLICATIONS

This regular utility non-provisional patent application claims priority benefit with regard to all common subject matter of earlier filed U.S. Provisional Patent Application titled "COMPUTER-IMPLEMENTED METHOD AND COMPUTER PROGRAM FOR DESIGNING AND COST-ESTIMATING IRRIGATION SYSTEMS", Ser. No. 62/491,017, filed on Apr. 27, 2017, which is hereby incorporated by reference in its entirety into the present application.

BACKGROUND

Automated software tools are often used to design and price or quote pivot and lateral irrigation systems. These tools typically use interactive mapping with satellite imagery provided from a web mapping service. This allows a user to outline a grower's actual field on an interactive map, draw the existing field boundaries, and place any obstructions such as buildings and electric poles. The user can then provide other inputs such as maximum flow rate and design flow rate required, field elevation, water pressure, voltage required, electricity and fuel costs, and required drop heights. Once these parameters are set, the automated software tools auto-calculate the optimal location to place a pivot point in the field and configures the spans, overhangs, corners, and other components to optimize the number of irrigated acres. The user can then make modifications to the design and save multiple configuration options. The automated software tools also create a bill of materials and generate a pricing quote that dealers or other users can use to build a sales offer to the grower.

Unfortunately, the above-described automated software tools have several drawbacks. For example, the user-provided data is generally based on favorable conditions and maximum irrigation requirements. This often results in "overbuilt" irrigation system configurations and irrigation systems that are not optimized for overall trends. These non-optimized configurations may also under-perform in unfavorable conditions, thus resulting in additional crop stress and/or yield loss. Furthermore, the above-described automated software tools are generally not designed to be used by growers and end-users, which prevents the growers and end-users from customizing and adapting their irrigation system specifications to changing design considerations.

SUMMARY

Embodiments of the present invention solve the above-described and other problems and limitations by providing an improved computer program, system, and method for generating, designing, and cost-estimating irrigation systems.

An embodiment of the invention is a method of generating and optimizing specifications for a new irrigation system comprising the steps of receiving in a computing device historical weather data for a target irrigation area; receiving in the computing device soil data for the target irrigation area; receiving in the computing device field elevation data and topography data for the target irrigation area; determining via the computing device crop evapotranspiration estimations, an irrigation system water flow rate requirement, an expected annual total water requirement, a required supply point water pressure, a required end point pivot water pressure, an electric power requirement, a pump size requirement, and a supply pipeline system size requirement based on at least one of the historical weather data, soil data, field elevation data, and topography data; and optimizing via the computing device the irrigation system specification according to a user selected variable or variables based on at least one of an estimated return on investment (ROI), an estimated payback period, a target peak yield, a maximum irrigated acreage, and minimum operating costs.

The weather data may be hyper-local, field location-specific daily, hourly, and/or sub-hourly weather for past years and historical averages. Weather data points may include maximum, minimum, and average temperature, maximum, minimum, and average relative humidity, maximum, minimum, and average wind speed, maximum, minimum, and average solar radiation, actual rainfall amount, rain intensity, and any other suitable weather information.

The soil data may be soil classification, soil type, maximum infiltration rate, water holding capacity, and any other suitable soil information. The soil data may be obtained from an available soil database such as Soil Survey Geographic Database (SSURGO), synced from an existing soil mapping service such as the Farmers Edge™ platform, imported from a third-party soil data repository, or manually uploaded from an existing data file.

The topography data may be field elevation maps, survey data, or any other suitable topography information; past or present aviation and/or satellite photographs and associated data; and yield maps or raw yield data. The aerial imagery, topography data, and past yield data may be integrated together to form data maps or other suitable data structures. The past or planned crop as-planted data may be crop type, relative maturity, comparative relative maturity, hybrid maturity, and other crop as-planted information.

Peak hourly, peak daily, and average crop evapotranspiration is determined based on historic weather averages or historic weather extremes and/or simulated based on weather data from specific past years. An irrigation system flow rate requirement for avoiding crop stress is determined based on calculated peak water usage needs. An expected annual total water requirement and an expected annual irrigation water requirement are determined based on historic weather averages or historic weather extremes and/or simulated based on weather from specific past years.

The supply point may be a pivot point, lateral water supply point, or other upstream point. The end point may be the end of a pivot system, the end of a lateral system, or any other downstream point.

The maximum irrigation acres without crop stress and/or yield loss are determined if the availability of water is limited. Limited water availability may be limited flow rate, limited annual or seasonal water allocation, or based on any other water availability metric. The maximum irrigated acres without crop stress and/or yield loss may be determined based on historic weather averages or historic weather extremes or simulated based on weather from specific past years.

The crop yield and/or market value of lost yield is estimated if the availability of water is limited. This step may be performed if the desired irrigated acres exceeds the maximum irrigated acres calculated to avoid crop stress and/or yield loss based on historic averages or historic extremes or simulated based on weather from specific past years.

The amount of yield lost in the field due to water stress without irrigation is also estimated. This may be determined based on historic weather averages or historic weather extremes or simulated based on weather from specific past years.

The electric power generator size may include electric power generator horsepower, maximum power requirements, and other power generator parameters. The pump size may include pressure requirements, flow rates, pump configurations, and other pump parameters. The pipeline supply system size may include pipe size lengths, fitting sizes, valve sizes, and other pipeline parameters. The electric power generator size, pump size, and pipeline supply system size may be determined based on historic weather averages or historic weather extremes, or simulated based on weather from specific past years.

Annual irrigation system usage, related equipment usage, and operating costs are also estimated. For example, annual operating hours, uptime, downtime, and costs associated with use of water, electricity, fuel, chemicals, nutrients, and other inputs may be determined based on historic weather averages or historic weather extremes, or simulated based on weather from specific past years.

A sprinkler package is also optimized to improve water infiltration rate, avoid water run-off, and minimize pivot full-circle time. For example, sprinkler spacing, sprinkler wetted diameter, sprinkler type, and other parameters may be selected. The sprinkler package may be optimized based on historic weather averages or historic weather extremes, or simulated based on weather from specific past years.

The irrigation system specification is then optimized according to user selected variables based on a return on investment (ROI), a payback period, a peak yield target, maximum irrigated acreage, minimum operating costs, and other considerations. The irrigation system specification is further optimized by incorporating options such as extensions, end guns, overhangs, corners, drop spans, mid-system pivot points, multi-pivot point extension systems, full precision variable rate irrigation with sprinkler control, and other configurations.

Another embodiment is a system for generating and optimizing an irrigation system specification, the system comprising a data server and a computing device in communication with each other over a communication network. The data server may be a remote server or computing device configured to receive and store historical weather data, soil data, field elevation data, and topography data for a target irrigation area.

The computing device may be a workstation computer, a desktop computer, a laptop computer, a tablet computer, a mobile device such as a smart phone or personal digital assistant (PDA), or the like. The computing device has an interactive user interface for allowing a user to input and change data, variables, parameters, and other information.

The computing device and/or data server determine, based on at least one of the historical weather data, soil data, field elevation data, and topography data: crop evapotranspiration estimations, an irrigation system water flow rate requirement, an expected annual total water requirement, a required supply point water pressure, a required end point pivot water pressure, an electric power requirement, a pump size requirement, and a supply pipeline system size requirement. The computing device and/or data server also optimize the irrigation system specification based on the estimated return on investment, estimated payback period, target peak yield, maximum irrigated acreage, and minimum operating costs according to inputs entered into the interactive user interface.

The computing device and/or data server also optimize the irrigation system specification by incorporating user-selected options such as extensions, end guns, overhangs, corners, drop spans, mid-system pivot points, multi-pivot point extension systems, full precision variable rate irrigation with sprinkler control, and other configurations.

Aspects of the above embodiments may be made partially or completely directly available to growers and end-users via an online interface, downloadable application, or software package. This allows growers and end-users to configure, optimize, simulate, and evaluate the return of adding and/or upgrading after-market retrofit irrigation solutions, such as the ones described above.

The above-described invention improves functionality of the computing device and data server by allocating collection of historic data to the data server and reception of user-inputted data to the computing device via the interactive user interface. Functionality of the computing device and data server is also improved by allocating optimization steps according to the source of the relied-upon data and/or the available computing power of the computing device and data server. For example, the computing device may perform an optimization step if the variable inputs are entered via the interactive user interface. Conversely, the data server may perform an optimization step if the variable inputs are data sets stored on the data server or if the computing power required for optimization is greater than the computing power of the computing device.

The above-described invention provides several advantages. For example, irrigation system specifications may be generated and optimized according to annual, daily, and hourly real and simulated weather and soil data. The weather and soil data can be obtained and/or generated from a single source or aggregated from multiple sources. Topography data, aerial images, yield maps, crop as-planted data, and other agricultural information can be utilized for generating more accurate crop outlooks and irrigation requirements. This results in more optimized irrigation system specifications than what is achievable in the current art. The present invention may also take into account periods of limited water allocation for estimations of crop yield loss and market value of lost yield. Irrigation system specifications may be further optimized according to user-selected variables such as ROI, pay back periods, peak yield targets, maximum irrigation acreage, and minimum operating costs; and design options such as extensions, end guns, overhangs, corners, drop spans, mid-system pivot points, multi-pivot point extension systems, full precision variable rate irrigation with sprinkler control, and other configurations. Specifications of existing irrigation systems may also be optimized in a similar manner. The present invention also allows growers and other end users to generate, optimize, and evaluate irrigation system specifications via the interactive user interface.

This summary is not intended to identify essential features of the present invention, and is not intended to be used to limit the scope of the claims. These and other aspects of the present invention are described below in greater detail.

DESCRIPTION OF THE DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
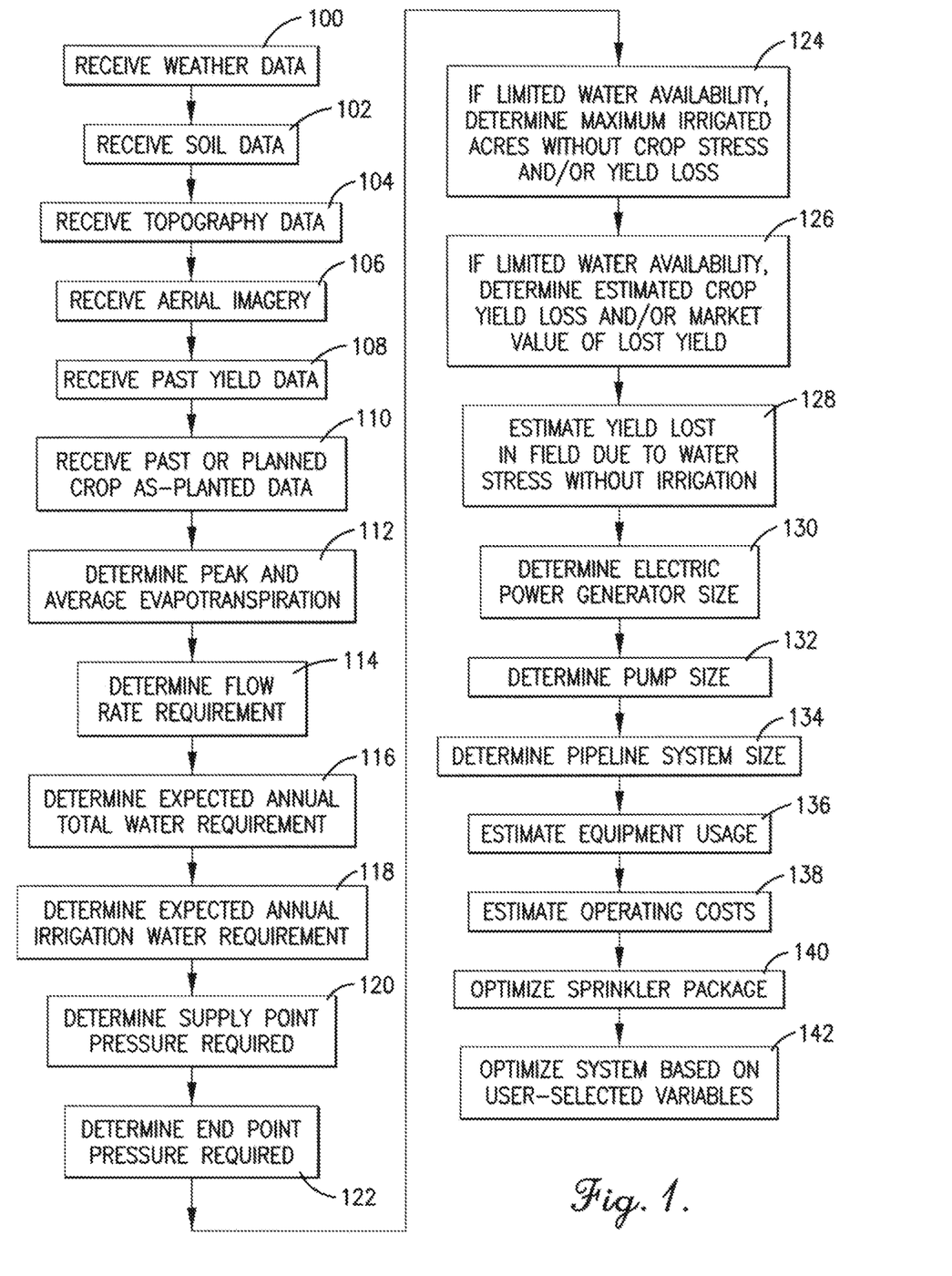
FIG. 1 is a flowchart illustrating steps involved in a method of optimizing a specification of an irrigation system in accordance with an embodiment of the invention.

Turning to FIG. 1, a computer-implemented method of generating and optimizing an irrigation system specification will now be described. Several method steps described herein may generally be performed in any order, including concurrently. For example, data acquisition steps 100-110 may be performed together, while output and estimation steps 112-142 may be performed subsequently. Alternatively, some output and estimation steps may be performed as soon as the necessary data has been obtained.

First, weather data may be received and stored in a data server (described in more detail below), as shown in block 100. The weather data may include hyper-local, field location-specific daily, hourly, and/or sub-hourly weather for past years and historical averages. Weather data points may include maximum, minimum, and average temperature, maximum, minimum, and average relative humidity, maximum, minimum, and average wind speed, maximum, minimum, and average solar radiation, actual rainfall amount, rain intensity, and any other suitable weather information.

Soil data may also be received and stored in the data server, as shown in block 102. The soil data may include soil classification, soil type, maximum infiltration rate, water holding capacity, and any other suitable soil information. The soil data may be obtained from an available soil database such as Soil Survey Geographic Database (SSURGO), synced from an existing soil mapping service such as the Farmers Edger™ platform, imported from a third-party soil data repository, or manually uploaded from an existing data file.

Topography data may be received and stored in the data server, as shown in block 104. The topography data may include a field elevation map, survey data, or any other suitable topography information. Aerial imagery may also be received, as shown in block 106. The aerial imagery may include past or present aviation and/or satellite photographs and associated data. Past yield data may be received, as shown in block 108. The past yield data may include yield maps or raw data and may be manually uploaded or received automatically. The aerial imagery, topography data, and past yield data may be integrated together to form data maps or other suitable data structures.

Past or planned crop as-planted data may be received and stored in the data server, as shown in block 110. For example, crop type, relative maturity, comparative relative maturity, hybrid maturity, and other crop as-planted information may be obtained.

The above data may then be used via a computing device (described in more detail below) in communication with the data server to automatically calculate or determine several outputs corresponding to operational metrics and efficiencies of an irrigation system. Evapotranspiration may be determined via the computing device, as shown in block 112. For example, peak hourly, peak daily, and average crop evapotranspiration may be determined based on historic weather averages or historic weather extremes and/or simulated based on weather data from specific past years.

An irrigation system flow rate requirement for avoiding crop stress may be determined via the computing device, as shown in block 114. For example, the flow rate requirement may be based on calculated peak water usage needs.

An expected annual total water requirement may be determined via the computing device, as shown in block 116. For example, the expected annual total water requirement may be based on historic weather averages or historic weather extremes and/or simulated based on weather from specific past years.

An expected annual irrigation water requirement may be determined via the computing device, as shown in block 118. For example, the expected annual irrigation water requirement may be based on historic weather averages or historic weather extremes or simulated based on weather from specific past years.

A supply point required pressure may be determined via the computing device, as shown in block 120. The supply point required pressure may be the pressure required at a pivot point, lateral water supply point, or other upstream point on the irrigation system.

An end point required pressure may also be determined via the computing device, as shown in block 122. The end point required pressure may be the pressure required at the end of a pivot system, the end of a lateral system, or any downstream point on the irrigation system.

The maximum irrigation acres without crop stress and/or yield loss may be determined via the computing device if the availability of water is limited, as shown in block 124. Limited water availability may be limited flow rate, limited annual or seasonal water allocation, or based on any other water availability metric. The maximum irrigated acres without crop stress and/or yield loss may be determined based on historic weather averages or historic weather extremes or simulated based on weather from specific past years.

The crop yield and/or market value of lost yield may be estimated via the computing device if the availability of water is limited, as shown in block 126. This step may be performed if the desired irrigated acres exceeds the maximum irrigated acres calculated to avoid crop stress and/or yield loss based on historic averages or historic extremes or simulated based on weather from specific past years.

The amount of yield lost in the field due to water stress without irrigation may be estimated via the computing device, as shown in block 128. This may be determined based on historic weather averages or historic weather extremes or simulated based on weather from specific past years.

An electric power generator size may be determined via the computing device, as shown in block 130. For example, the electric power generator horsepower, maximum power requirements, and other parameters may be determined based on historic weather averages or historic weather extremes, or simulated based on weather from specific past years.

A pump size may be determined via the computing device, as shown in block 132. For example, pressure requirements, flow rates, pump configurations, and other pump parameters may be determined based on historic weather averages or historic weather extremes, or simulated based on weather from specific past years.

A pipeline supply system size may be determined via the computing device, as shown in block 134. For example, pipe sizes and lengths, fitting sizes, valve sizes, and other parameters may be determined based on historic weather averages or historic weather extremes, or simulated based on weather from specific past years.

Annual irrigation system usage and related equipment usage may be estimated via the computing device, as shown in block 136. For example, annual operating hours, uptime, and downtime may be determined based on historic weather averages or historic weather extremes, or simulated based on weather from specific past years.

Operating costs may be estimated via the computing device, as shown in block 138. For example, costs associated with use of water, electricity, fuel, chemicals, nutrients, and other inputs may be determined based on historic weather averages or historic weather extremes, or simulated based on weather from specific past years.

A sprinkler package for the irrigation system 10 may be optimized via the computing device for improving water infiltration rate, avoid water run-off, and minimize pivot full-circle time, as shown in block 140. For example, sprinkler spacing, sprinkler wetted diameter, sprinkler type, and other parameters may be selected. The sprinkler package may be optimized based on historic weather averages or historic weather extremes, or simulated based on weather from specific past years.

The irrigation system specification may be optimized via the computing device according to user selected variables entered via an interactive user interface of the computing device, as shown in block 142. For example, the above parameters of the irrigation system 10 may be optimized based on a return on investment (ROI), a payback period, a peak yield target, maximum irrigated acreage, minimum operating costs, and other considerations. Irrigation system specification optimization may include incorporating options such as extensions, end guns, overhangs, corners, drop spans, mid-system pivot points, multi-pivot point extension systems, full precision variable rate irrigation with sprinkler control, and other configurations.

In another embodiment, a specification of an existing irrigation system 10 may be optimized via the computing device. First, the specification may be received via the data server or computing device, as shown in block 200 of FIG. 2. The computing device may then modify the specification with after-market retrofit solutions such as extensions, end guns, overhangs, corners, drop spans, mid-system pivot points, multi-pivot point extension systems, full precision variable rate irrigation with sprinkler control, and other configurations, as shown in block 202. The computing device may also optimize the specification based on a financial return, internal rate of return (IRR), payback, and other financial metrics may be determined, as shown in block 204.

Aspects of the above embodiments may be made partially or completely directly available to growers and end-users via an online interface, downloadable application, or software package stored on or accessed by the computing device, as described below. This allows growers and end-users to configure, optimize, simulate, and evaluate the return of adding and/or upgrading after-market retrofit irrigation solutions.

Figures 2, 3:
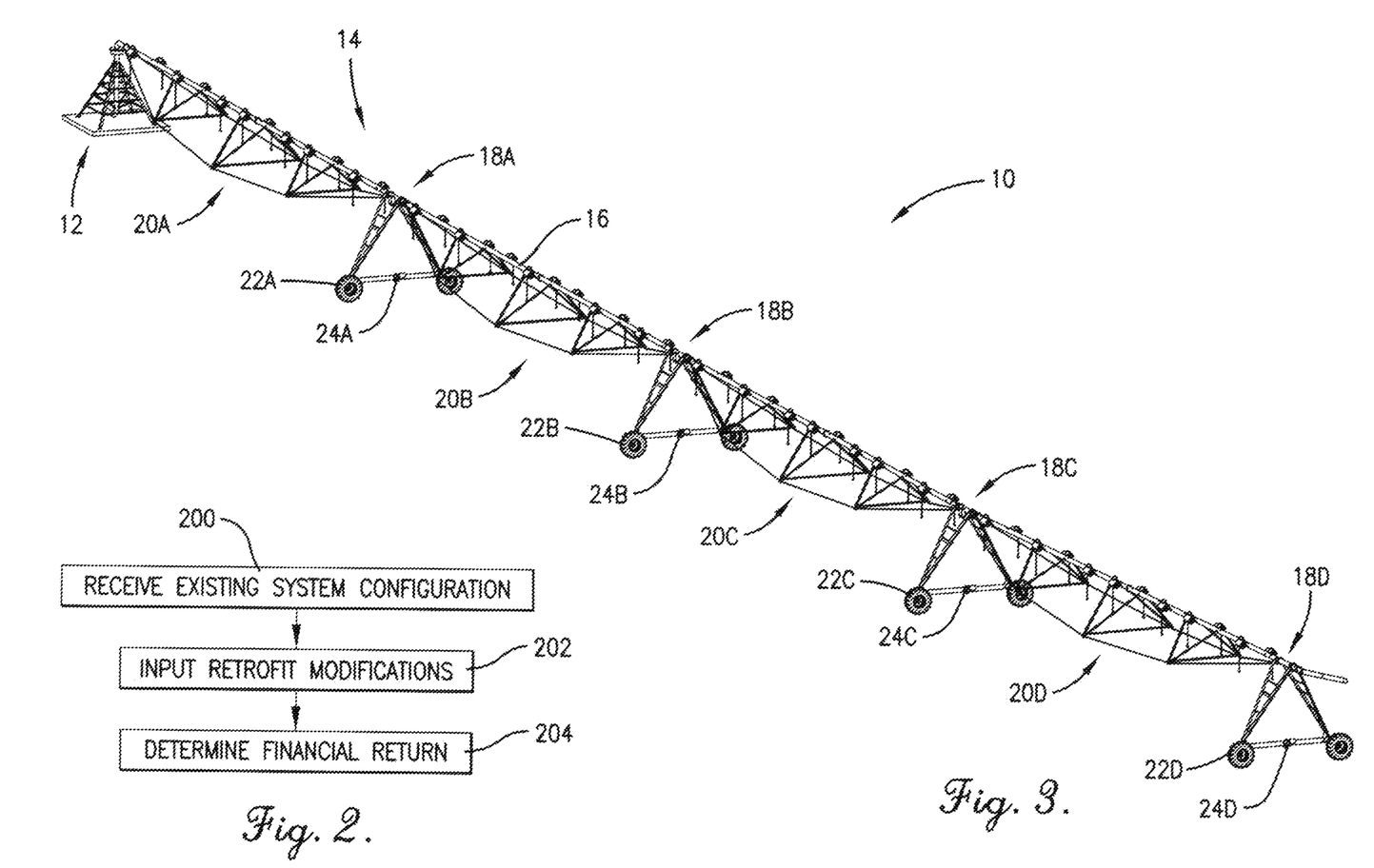
FIG. 2 is a flowchart illustrating steps involved in a method of optimizing a specification of an existing irrigation system in accordance with another embodiment of the invention.
FIG. 3 is a perspective view of an exemplary fixed central pivot type irrigation system for use with embodiments of the invention.
Figure 4:
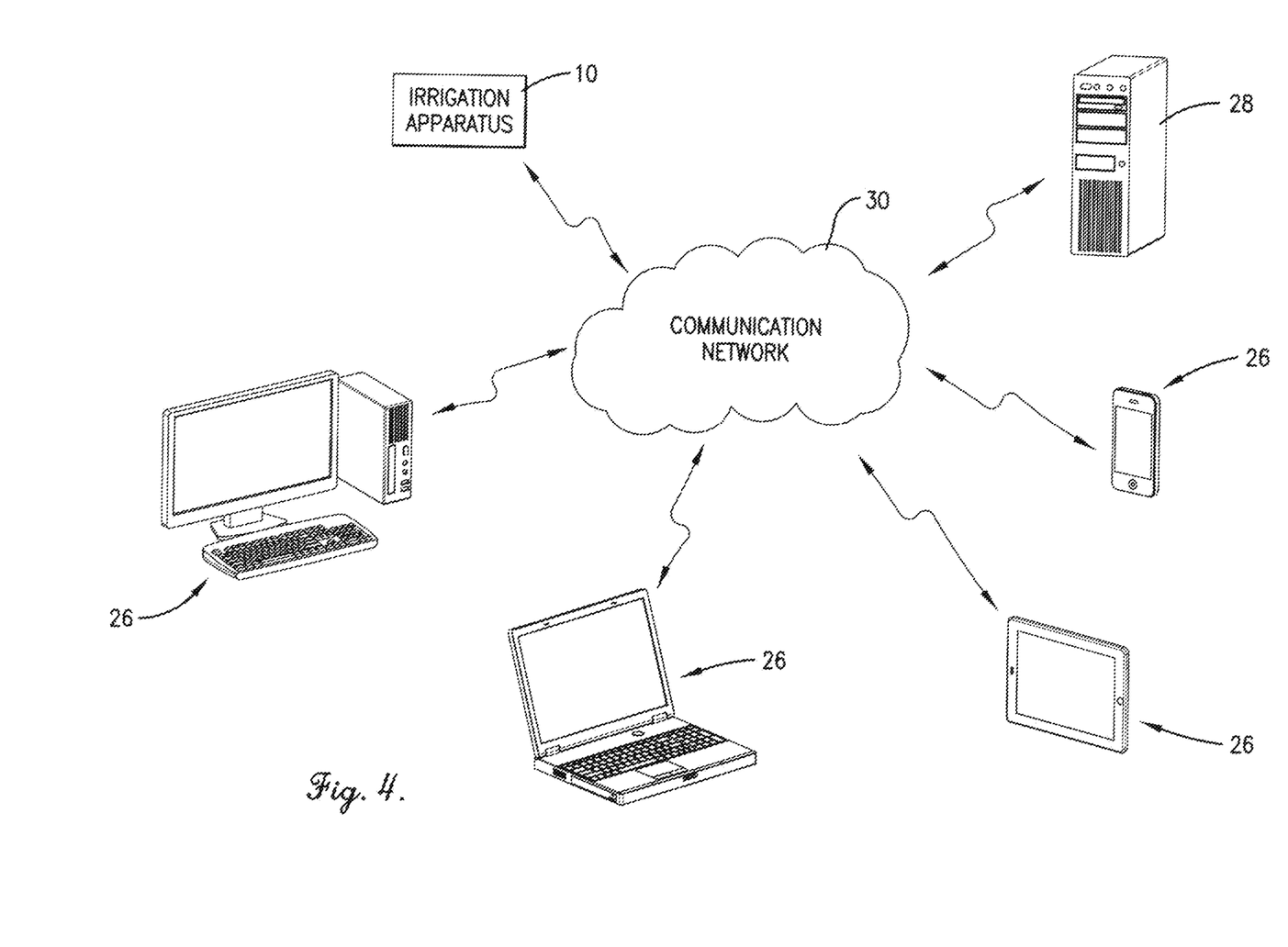
FIG. 4 is a schematic diagram of computing elements and the irrigation system of FIG. 3 in communication over a communication network in accordance with an embodiment of the invention.

Turning now to FIGS. 3 and 4, an exemplary embodiment of the irrigation system 10 is a central pivot irrigation system and broadly comprises a fixed central pivot 12 and a main section 14 pivotally connected to the central pivot 12. The irrigation system 10 may also comprise an extension arm (also commonly referred to as a "swing arm" or "corner arm") pivotally connected to the free end of the main section 14. The irrigation system 10 may also be embodied by a lateral or linear move apparatus without departing from the scope of the current invention.

The fixed central pivot 12 may be a tower or any other support structure about which the main section 14 may pivot. The central pivot 12 has access to a well, water tank, or other source of water and may also be coupled with a tank or other source of agricultural products to inject fertilizers, pesticides and/or other chemicals into the water for application during irrigation. The central pivot 12 may supply water to a conduit 16 which carries the water along the length of the main section 14.

The main section 14 may comprise any number of mobile support towers 18A-D, the outermost 18D of which is referred to herein as an end tower. The support towers 18A-D are connected to the fixed central pivot 12 and to one another by truss sections 20A-D or other supports to form a number of interconnected spans.

The mobile towers have wheels 22A-D, at least one of which is driven by suitable drive motors 24A-D. Each motor 24A-D turns at least one of its wheels 22A-D through a drive shaft to propel its mobile tower 18 and thus the main section 14 in a circle about the central pivot 12 to irrigate a field. The motors 24 may also have several speeds or be equipped with variable speed drives. The operation of the motors 24A-D, such as whether they are on or off, the speed of travel, and the direction of travel, may be controlled with one or more electronic signals or digital data.

Each of the truss sections 20A-D carries or otherwise supports the conduit 16 and other fluid distribution mechanisms that are connected in fluid communication to the conduit 16. Fluid distribution mechanisms may include sprayers, diffusers, or diffusers, each optionally attached to a drop hose, or the like. In addition, the conduit 16 may include one or more valves which control the flow of water through the conduit 16. The opening and closing of the valves may be automatically controlled with an electronic signal or digital data.

Turning to FIG. 4, a software tool for generating and optimizing irrigation system specifications may be implemented via one or more computing devices 26 in communication with a data server 28 via a communication network 30. Each computing device 26 may be a workstation computer, a desktop computer, a laptop computer, a tablet computer, a mobile device such as a smart phone or personal digital assistant (PDA), or any other suitable computing device. The computing devices 26 may have or may display an interactive user interface for inputting and changing data, variables, parameters, and other information as described above. The interactive user interface may be built into the computing devices 26 or may be an online website, a downloadable application, a computer program, or any other interactive software.

Some data used by the software tool may be stored in and retrieved from the data server 28 and accessed via the communication network 16. For example, the data server 28 may store past weather data such as historic averages and historic extremes of temperature, relative humidity, wind speed, solar radiation, rainfall amount, and rain intensity; soil data such as soil classification, soil type, and water holding capacity; topography; aerial imagery; past yield data and yield maps; and past/planned crop as-planted data. The data server 28 may also retrieve and/or aggregate this data from several external sources such as agricultural databases, third party data repositories, GPS databases, and other sources.

The software tool may be stored on a memory element, which may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. The memory element may include, or may constitute, a "computer-readable medium". The memory element may store the instructions, code, code segments, software, firmware, programs, applications, apps, services, daemons, or the like that are executed by a processing element.

The processing element may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element may generally execute, process, or run instructions, code, code segments, software, firmware, programs, applications, apps, processes, services, daemons, or the like. The processing element may also include hardware components such as finite-state machines, sequential and combinational logic, and other electronic circuits that can perform the functions necessary for the operation of the current invention. The processing element may be in communication with the other electronic components through serial or parallel links that include universal busses, address busses, data busses, control lines, and the like.

Through hardware, software, firmware, or various combinations thereof, the processing element may be programmed to, or configured to, perform the tasks or functions described herein. For example, weather data (real or simulated) may be input into the computing device 26 via the interactive user interface or retrieved from the data server 28. The processing element may then determine or estimate the various outputs such as crop evapotranspiration, flow rate requirements, annual water requirements, required water pressures, maximum irrigated acreage, estimated crop yield loss and lost yield market value, estimated yield loss due to water stress without irrigation, power generator size, pump size, pipeline size, estimated annual irrigation system usage, and related equipment usage. The processing element may also optimize aspects of the irrigation system 10 according to variables selected by the user via the interactive user interface of the computing device 26. The processing element may also determine, for retrofit applications, the financial return, IRR, or payback for adding aftermarket retrofit solutions selected by the user via the interactive user interface of the computing device 26.

The above-described invention improves functionality of the computing device and data server by allocating collection of historic data to the data server while receiving user-inputted data via the interactive user interface of the computing device. Functionality of the computing device and data server is also improved by allocating optimization steps according to the source of the relied-upon data and/or the available computing power of the computing device and data server. For example, the computing device may perform an optimization step if the variable inputs are entered via the interactive user interface. Conversely, the data server may perform an optimization step if the variable inputs are data sets stored on the data server or if the computing power required for optimization is greater than the computing power of the computing device.

The above-described invention provides several advantages. For example, irrigation system specifications may be generated and optimized according to annual, daily, and hourly real and simulated weather and soil data. The weather and soil data can be obtained and/or generated from a single source or aggregated from multiple sources. Topography data, aerial images, yield maps, crop as-planted data, and other agricultural information can be utilized for generating more accurate crop outlooks and irrigation requirements. This results in more optimized irrigation system specifications than what is achievable in the current art. The present invention may also take into account periods of limited water allocation for estimations of crop yield loss and market value of lost yield. Irrigation system specifications may be further optimized according to user-selected variables such as ROI, pay back periods, peak yield targets, maximum irrigation acreage, and minimum operating costs; and design options such as extensions, end guns, overhangs, corners, drop spans, mid-system pivot points, multi-pivot point extension systems, full precision variable rate irrigation with sprinkler control, and other configurations. Specifications of existing irrigation systems may also be optimized in a similar manner. The present invention also allows growers and other end users to generate, optimize, and evaluate irrigation system specifications via the interactive user interface.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A computer-implemented method of generating and optimizing an irrigation system specification, the method comprising the steps of:
    receiving in a data server historical weather data for a target irrigation area;

receiving in the data server soil data for the target irrigation area;
receiving in the data server field elevation data and topography data for the target irrigation area;
determining, based on at least one of the historical weather data, soil data, field elevation data, and topography data, via user inputs received by an interactive user interface of a computing device in communication with the data server:
crop evapotranspiration estimations;
an irrigation system water flow rate requirement;
an expected annual total water requirement;
a required supply point water pressure;
a required end point pivot water pressure;
an electric power requirement;
a pump size requirement;
a supply pipeline system size requirement;
if water availability is limited, at least one of a maximum irrigation acreage without crop stress and a maximum irrigation acreage without yield loss; and
at least one of an estimated crop yield loss and a market value of lost yield if a desired irrigated acreage exceeds the maximum irrigation acreage;
optimizing, via at least one of the computing device and the data server, the irrigation system specification according to a user selected variable or variables based on at least one of an estimated return on investment (ROI), an estimated payback period, a target peak yield, a maximum irrigated acreage, and minimum operating costs;
configuring an irrigation system according to the optimized irrigation system specification, the irrigation system comprising:
a plurality of mobile towers each including a motor and a wheel driven by the motor;
a plurality of truss sections connected between the plurality of mobile towers, the plurality of truss sections being pivotable relative to each other;
a conduit supported by the plurality of truss sections, the conduit being configured to transport water from a water source;
a plurality of fluid distribution mechanisms configured to dispense water to the target irrigation area;
a plurality of valves configured to control a flow of the water through the conduit; and
automatically controlling opening and closing of the plurality of valves via one of an electronic signal and digital data.

2. The method of claim 1, wherein the historical weather data includes hyper local, field location specific sub-hourly weather data and historical maximum, minimum, and average temperature, maximum, minimum, and average relative humidity, maximum, minimum, and average wind speed, maximum, minimum, and average solar radiation, actual rainfall amount, and rain intensity.

3. The method of claim 1, wherein the soil data includes a soil classification or soil type, a maximum infiltration rate, and a water holding capacity.

4. The method of claim 1, wherein the step of receiving soil data includes receiving soil data from a soil mapping service.

5. The method of claim 1, further comprising the step of receiving past satellite or aerial imagery of the target irrigation area.

6. The method of claim 1, further comprising the step of receiving past yield data.

7. The method of claim 1, further comprising the step of receiving past crop as-planted data.

8. The method of claim 1, wherein the crop evapotranspiration data includes peak hourly, peak daily, and average crop evapotranspiration data.

9. The method of claim 1, wherein the determination step further includes determining a yield loss due to water stress without irrigation amount.

10. The method of claim 1, wherein the electric power requirement is an electric power generator size requirement.

11. The method of claim 1, wherein the determination step further includes determining a yield loss due to water stress without irrigation amount.

12. A computer-implemented method of optimizing a specification of an existing irrigation system, the method comprising the steps of:
receiving in a data server historical weather data for a target irrigation area;
receiving in the data server soil data for the target irrigation area;
receiving field elevation data and topography data for the target irrigation area;
determining, based on at least one of the historical weather data, soil data, field elevation data, and topography data, via user inputs received by an interactive user interface of a computing device in communication with the data server:
crop evapotranspiration estimations;
an irrigation system water flow rate requirement;
an expected annual total water requirement;
a required supply point water pressure;
a required end point pivot water pressure;
an electric power requirement;
a pump size requirement;
a supply pipeline system size requirement;
if water availability is limited, at least one of a maximum irrigation acreage without crop stress and a maximum irrigation acreage without yield loss; and
at least one of an estimated crop yield loss and a market value of lost yield if a desired irrigated acreage exceeds the maximum irrigation acreage;
modifying, via at least one of the computing device and data server, the irrigation system specification according to a user selected variable or variables based on at least one of an estimated return on investment (ROI), an estimated payback period, a target peak yield, a maximum irrigated acres, and minimum operating costs; and
modifying the existing irrigation system according to the optimized irrigation system specification, the existing irrigation system comprising:
a plurality of mobile towers each including a motor and a wheel driven by the motor;
a plurality of truss sections connected between the plurality of mobile towers, the plurality of truss sections being pivotable relative to each other;
a conduit supported by the plurality of truss sections, the conduit being configured to transport water from a water source;
a plurality of fluid distribution mechanisms configured to dispense water to the target irrigation area;
a plurality of valves configured to control a flow of the water through the conduit; and
automatically controlling opening and closing of the plurality of valves via one of an electronic signal and digital data.

13. The method of claim 12, wherein the historical weather data includes hyper local, field location specific sub-hourly weather data and historical maximum, minimum, and average temperature, maximum, minimum, and average relative humidity, maximum, minimum, and average wind speed, maximum, minimum, and average solar radiation, actual rainfall amount, and rain intensity.

14. The method of claim 12, wherein the soil data includes a soil classification or soil type, a maximum infiltration rate, and a water holding capacity.

15. The method of claim 12, wherein the crop evapotranspiration data includes peak hourly, peak daily, and average crop evapotranspiration data.

16. A system for generating and optimizing an irrigation system specification, the system comprising:
   a data server configured to receive:
      historical weather data for a target irrigation area,
      soil data for the target irrigation area, and
      field elevation data and topography data for the target irrigation area;
   a mobile computing device configured to communicate with the data server over a communication network, the mobile computing device having an interactive user interface configured to receive user inputs for calculating at least one of:
      an estimated return on investment,
      an estimated payback period,
      a target peak yield,
      a maximum irrigated acreage, and
      minimum operating costs;
   at least one of the data server and mobile computing device being further configured to:
      determine based on at least one of the historical weather data, soil data, field elevation data and topography data:
         crop evapotranspiration estimations,
         an irrigation system water flow rate requirement,
         an expected annual total water requirement,
         a required supply point water pressure,
         a required end point pivot water pressure,
         an electric power requirement,
         a pump size requirement, and
         a supply pipeline system size requirement,
         if water availability is limited, at least one of a maximum irrigation acreage without crop stress and a maximum irrigation acreage without yield loss, and
         at least one of an estimated crop yield loss and a market value of lost yield if a desired irrigated acreage exceeds the maximum irrigation acreage;
      optimize the irrigation system specification based on the estimated return on investment, estimated payback period, target peak yield, maximum irrigated acreage, and minimum operating costs, the optimization including incorporating an irrigation system option selected from the group consisting an extension, an end gun, an overhang, a corner, a drop span, a mid-system pivot point, a multi-pivot point extension system, and full precision variable rate irrigation with sprinkler control; and
   an irrigation system comprising:
      a plurality of mobile towers each including a motor and a wheel driven by the motor;
      a plurality of truss sections connected between the plurality of mobile towers, the plurality of truss sections being pivotable relative to each other;
      a conduit supported by the plurality of truss sections, the conduit being configured to transport water from a water source;
      a plurality of fluid distribution mechanisms configured to dispense water to the target irrigation area; and
      a plurality of valves configured to control a flow of the water through the conduit,
      the irrigation system being configured according to the optimized irrigation system specification,
the system being configured to automatically control opening and closing of the plurality of valves via one of an electronic signal and digital data.

* * * * *